UNITED STATES PATENT OFFICE.

NELSON GOODYEAR, OF NEW YORK, N. Y.

IMPROVEMENT IN THE MANUFACTURE OF INDIA-RUBBER.

Specification forming part of Letters Patent No. 8,075, dated May 6, 1851.

*To all whom it may concern:*

Be it known that I, NELSON GOODYEAR, of the city, county, and State of New York, have invented a new and useful Improvement in the Preparation and Manufacture of Caoutchouc or India-Rubber; and I do hereby declare that the following is a full and exact description thereof.

The nature of my invention consists in so compounding caoutchouc with other substances that the composition thus formed, when subjected to the heating or curing process described in the patent of Charles Goodyear, dated June 15, 1844, and in the reissue of said patent, dated December 25, 1849, will form a hard stiff substance hitherto unknown. The need of some such substance in several branches of the india-rubber manufacture first called my attention to the subject, and experiments were commenced by me for the purpose of ascertaining whether caoutchouc could not be so treated as to be rendered comparatively hard and stiff. My efforts were, after repeated trials, at last successful, and the result, so far as then ascertained, was communicated in a caveat filed in the Patent Office and dated December, 1849. Further experiments made by me since the filing of that caveat have confirmed the entire success of my invention.

To enable others skilled in the manufacture of caoutchouc to understand and use my invention, I will proceed to describe the process.

The indispensable ingredients used in my composition are caoutchouc and sulphur, and when only these two ingredients are used the best proportion will be about equal parts, by weight, of each of them; indeed a much less proportion of sulphur will not suffice. But though the combination of so large a proportion of sulphur with the caoutchouc will not produce, when cured, a hard substance, a still better result will be obtained by the introduction of magnesia, lime, carbonate of magnesia or lime, or sulphate of magnesia or lime into the composition, in which case the following proportion will be found a highly advantageous one—viz., one pound of caoutchouc, half a pound of sulphur, and half a pound of magnesia or lime, or carbonate of magnesia or lime, or sulphate of magnesia or lime.

The proportions specified in both of these compounds may be considerably varied without materially changing the result; but in no case will a much less quantity of sulphur than four ounces to every pound of caoutchouc be sufficient, in which respect particularly my compounds differ very essentially from every other composition of india-rubber in use, as in all other rubber compositions the least quantity of sulphur that will suffice to cure the article is aimed at. With either of these compounds just described gum-lac (or gum-shellac) may be combined to great advantage—say in the proportion of from four to eight ounces of gum-lac to every pound of caoutchouc. Rosin, oxides or salts of lead or zinc of all colors, and other similar substances, both mineral and vegetable, may be added in small quantities to either of the compounds for the purposes of polish, color, making the mixture work more easily, &c., no precise rule for which can be given or is necessary, as the operator will easily discriminate.

The ingredients may be mixed and incorporated with one another in the usual methods employed in the manufacture of compounds of caoutchouc. When mixed the compound may be either rolled into sheets by means of calendering-rollers or formed by molding or other well-known processes into any desired shape for the purpose of being used in the manufacture of such articles as the same may be applicable to. The compounds must then be subjected to the heating or curing process already mentioned as patented by Charles Goodyear, and to which reference is hereby made for a particular description thereof. In most cases the heat will be required to be raised as high as 260° or 275° Fahrenheit, and the time of exposure to the heat will range from three to six hours, or even longer.

When it is desired to use the hard substance formed by my compounds with the common vulcanized rubber goods they should be attached to one another before either is cured, and then cured together.

I do not claim the heating or "curing" process, as it is termed, that having been patented by Charles Goodyear.

What I do claim as my invention, and desire to secure by Letters Patent, is—

1. The combining of india-rubber and sulphur, either with or without shellac, for making a hard and inflexible substance hitherto unknown, substantially as herein set forth.

2. The combining of india-rubber, sulphur, and magnesia or lime, or a carbonate or a sulphate of magnesia or of lime, either with or without shellac, for making a hard and inflexible substance hitherto unknown, substantially as herein set forth.

New York, December 26, 1850.

NELSON GOODYEAR.

In presence of—
 SALLIE F. ELLIOT,
 WM. H. ELLIOT, Jr.